United States Patent [19]

Piesinger

[11] Patent Number: 4,726,039
[45] Date of Patent: Feb. 16, 1988

[54] CONSTANT AMPLITUDE PSK MODULATOR

[75] Inventor: Gregory H. Piesinger, Scottsdale, Ariz.

[73] Assignee: Honeywell Inc., Minneapolis, Minn.

[21] Appl. No.: 861,183

[22] Filed: May 9, 1986

[51] Int. Cl.⁴ .............................................. H04L 27/20
[52] U.S. Cl. ................................. 375/67; 332/16 R; 332/23 R
[58] Field of Search .................. 375/52, 67; 455/42, 455/102; 332/16 R, 21, 22, 23 R

[56] References Cited

U.S. PATENT DOCUMENTS

| 4,216,542 | 8/1980 | Hermesmeyer | 455/102 |
| 4,338,579 | 7/1982 | Rhodes | 332/22 |
| 4,540,958 | 9/1985 | Neyens et al. | 332/22 |
| 4,612,518 | 9/1986 | Gians et al. | 332/22 |
| 4,613,976 | 9/1986 | Sewerinson et al. | 375/67 |

Primary Examiner—Robert L. Griffin
Assistant Examiner—Stephen Chin
Attorney, Agent, or Firm—Seymour Levine; Albin Medved

[57] ABSTRACT

A phase modulating system for providing PSK modulation with minimum sidelobe generation. Phase changes, during the phase transition period, are accomplished with a minimum of carrier amplitude variation. I and Q components of the carrier system are multiplied by functions derived from the data and then combined to form a constant amplitude signal during all phases of the data signal.

9 Claims, 25 Drawing Figures

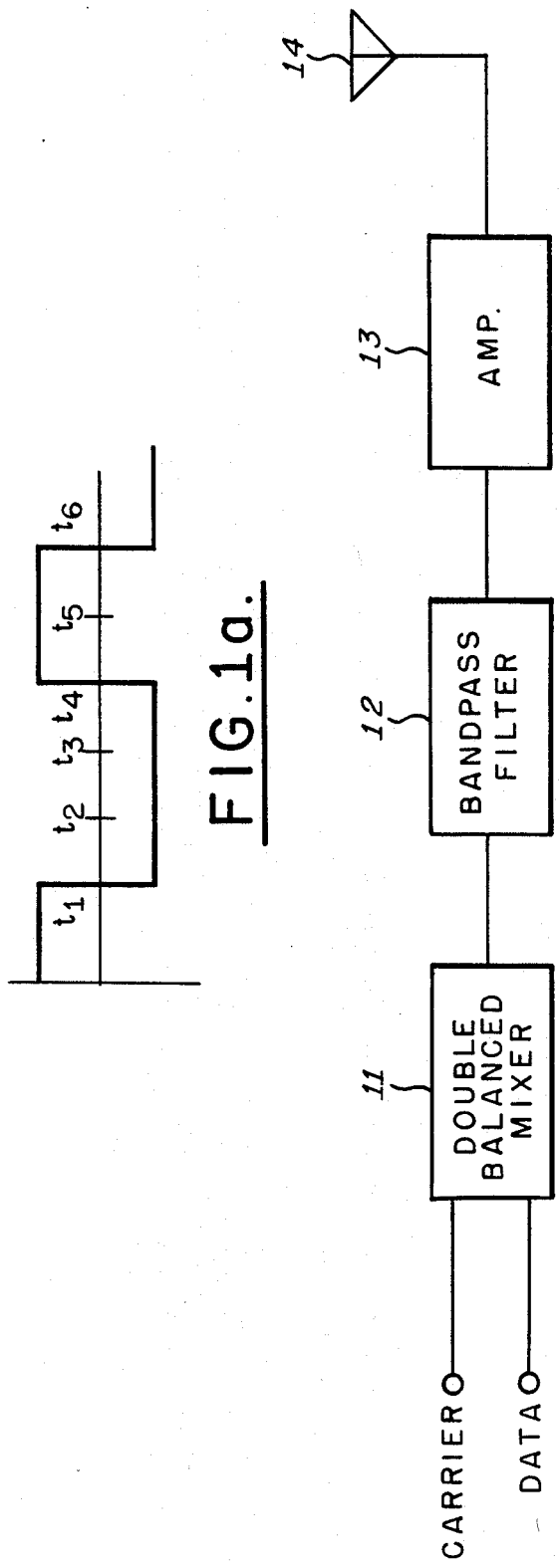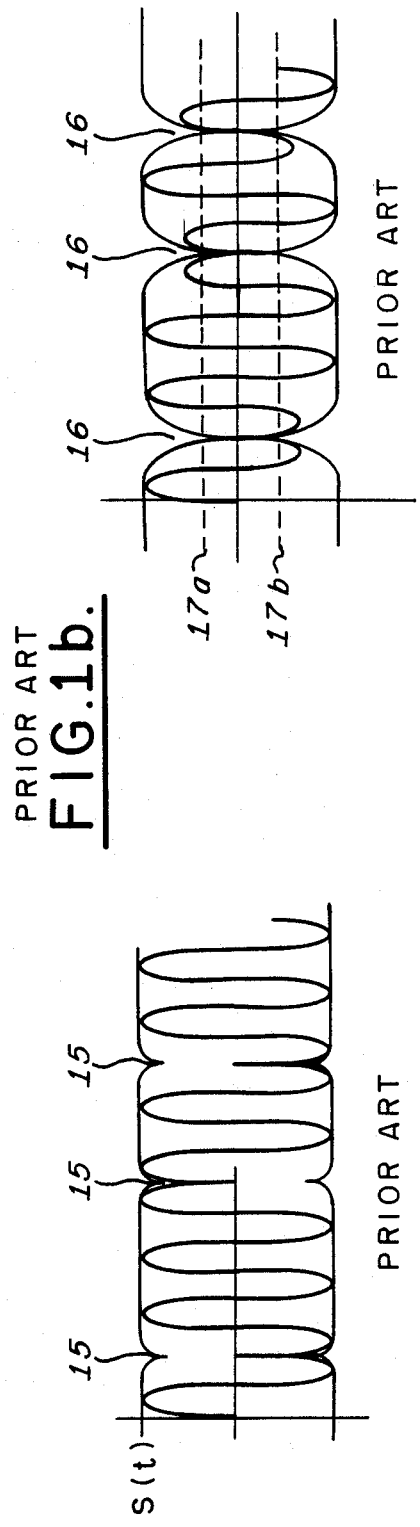

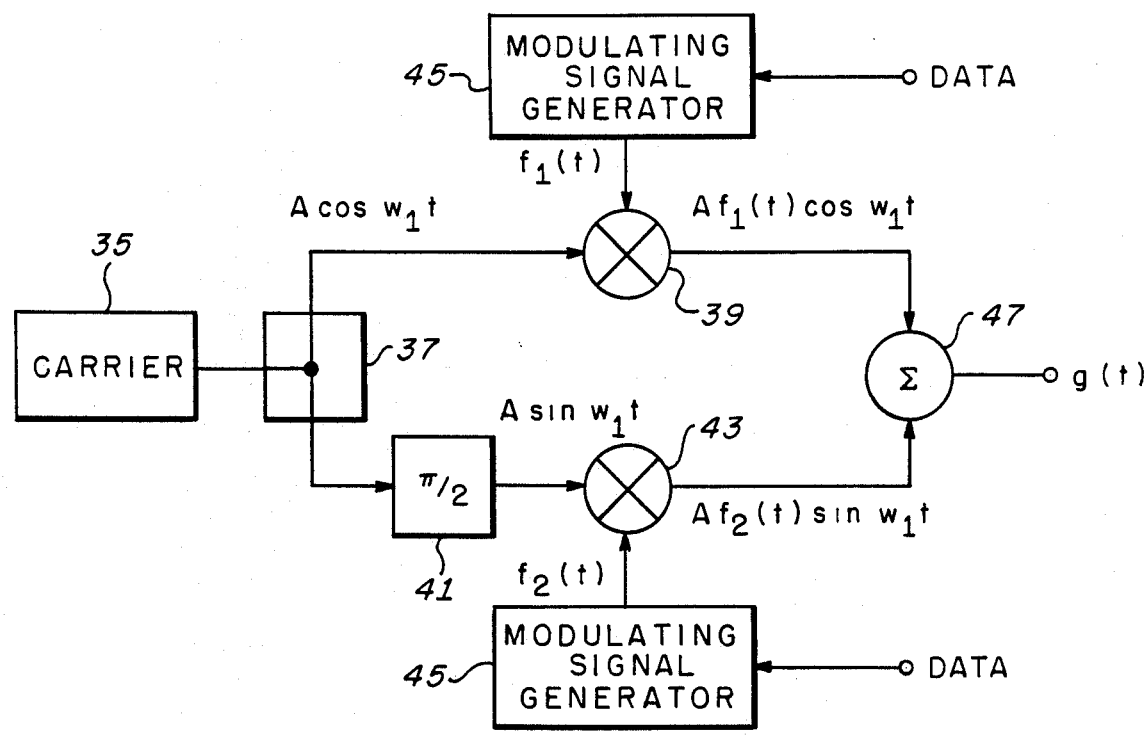

FIG.6a.

(1) $\quad g(t) = A\left[f_1(t)\cos W_1 t + f_2(t)\sin W_1 t\right]$ (2) $\quad g(t) = A\sqrt{f_1^2(t) + f_2^2(t)}\,\cos\left[W_1 t - \tan^{-1}\left(\dfrac{f_2(t)}{f_1(t)}\right)\right]$ (2a) $\quad \begin{cases} f_1(t) = K \\ f_2(t) = 0 \end{cases} g_A(t) = AK\cos W_1 t \Bigg\} \; t < t_0$ (2b) $\quad \begin{cases} f_1(t) = K\cos\dfrac{\pi}{T}(t-t_0) \\ f_2(t) = K\sin\dfrac{\pi}{T}(t-t_0) \end{cases} g_B(t) = AK\cos\left[W_1 t - \dfrac{\pi}{T}(t-t_0)\right]\Bigg\} \; t_0 \leq t \leq t_0 + T$ (2c) $\quad \begin{cases} f_1(t) = -K \\ f_2(t) = 0 \end{cases} g_C(t) = -AK\cos W_1 t \quad t_0 + T < t \leq t_0 + t_D$ (2d) $\quad \begin{cases} f_1(t) = K\cos\left[\pi - \dfrac{\pi}{T}(t-t_0-t_D)\right] \\ f_2(t) = K\sin\left[\pi - \dfrac{\pi}{T}(t-t_0-t_D)\right] \end{cases} g_D(t) = AK\cos\left[W_1 t - \pi - \dfrac{\pi}{T}(t-t_0-t_D)\right]$
$\qquad\qquad\qquad\qquad\qquad\qquad\qquad\qquad\qquad\qquad t_0 + t_D < t \leq t_0 + t_D + T$ (2e) $\quad \begin{cases} f_1(t) = K \\ f_2(t) = 0 \end{cases} g_E(t)\, AK\cos W_1 t \quad t_0 + t_D + T < t$

FIG.6b.

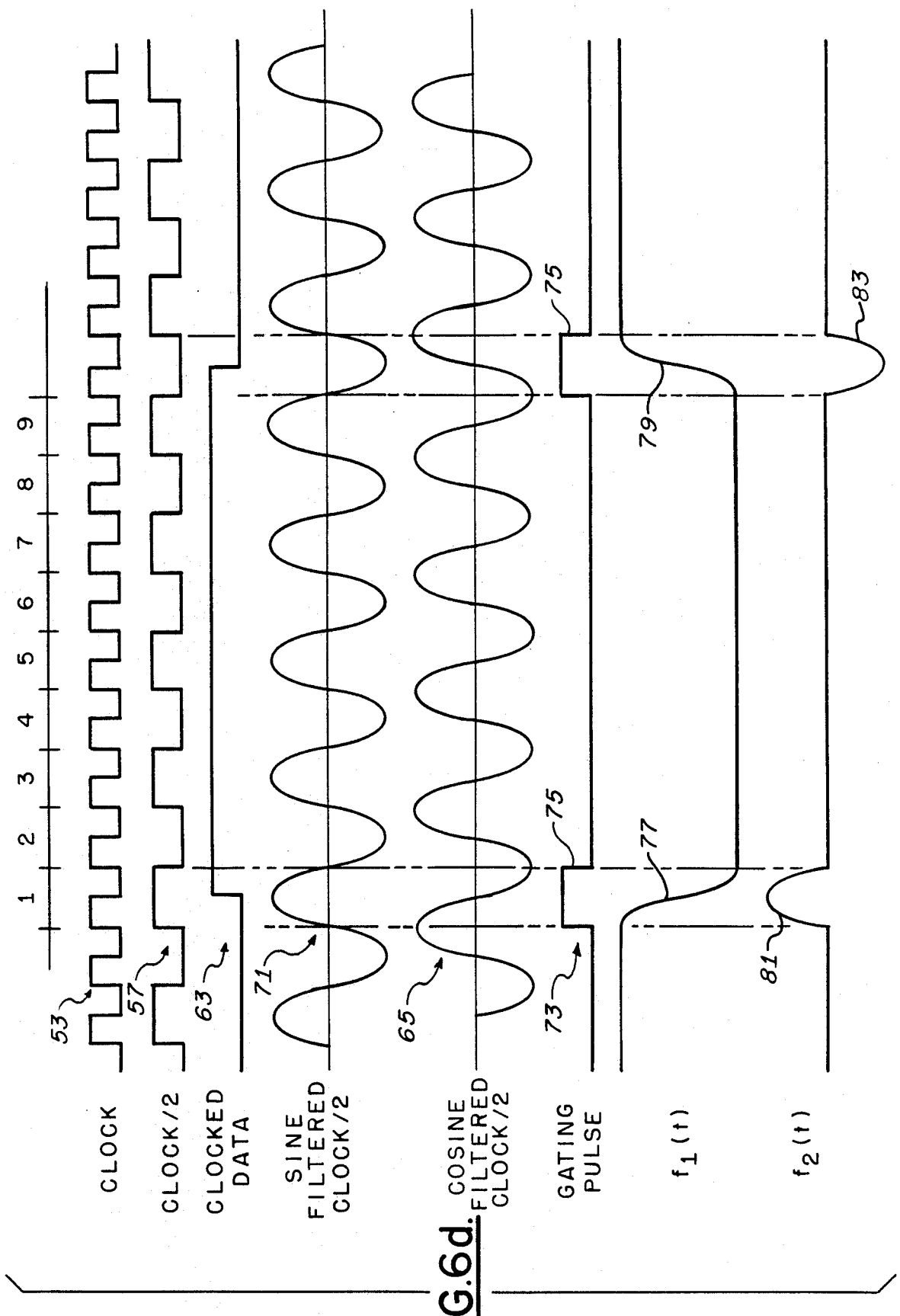

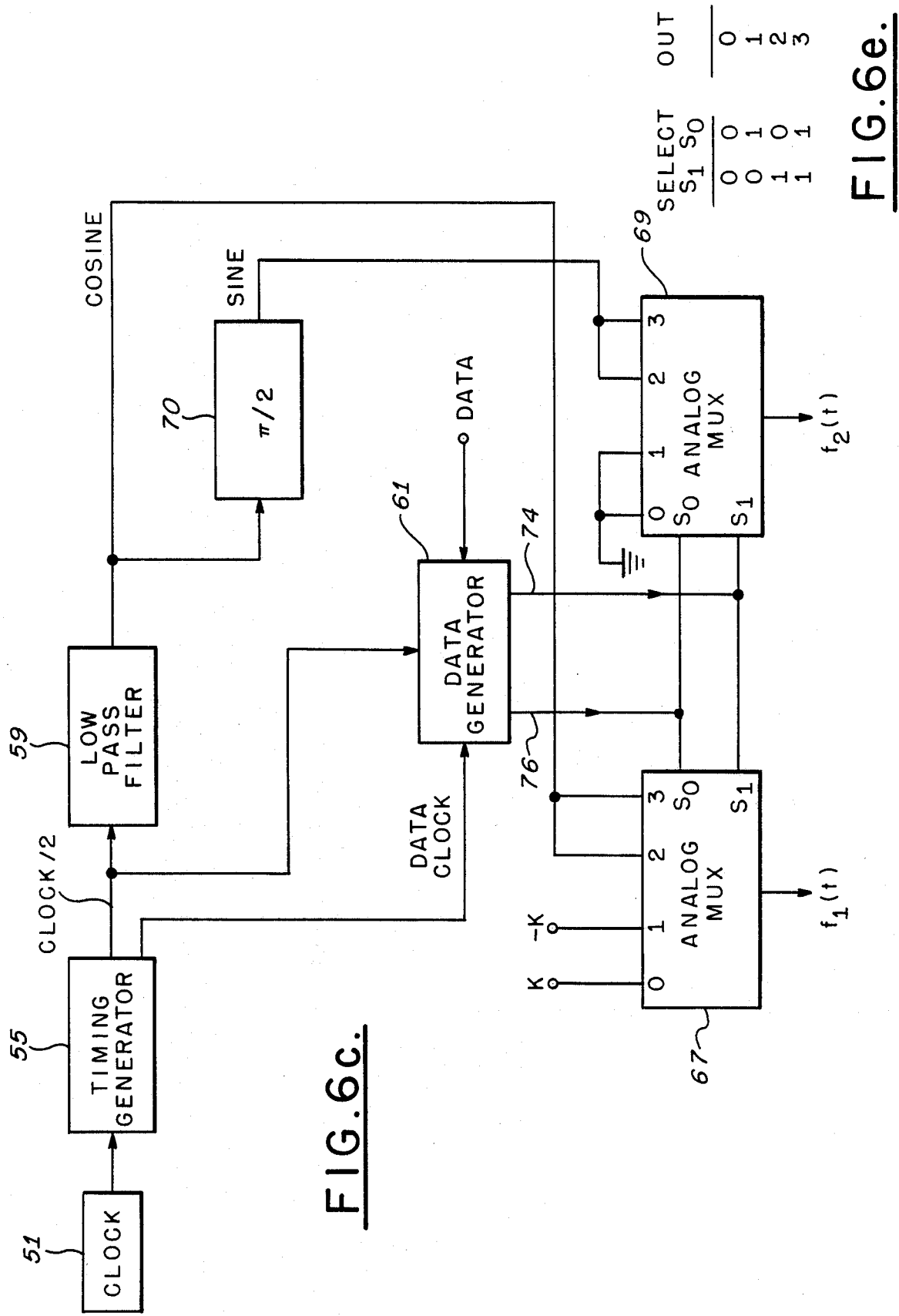

(3a) $\begin{aligned} f_1(t) &= K \\ f_2(t) &= 0 \end{aligned}$  $\quad g(t) = AK \cos W_1 t \quad t_0 > t$ (3b) $\begin{aligned} f_1(t) &= K - \frac{2K}{T}(t-t_0) \\ f_2(t) &= \frac{2K}{T}(t-t_0) \end{aligned}$  $g(t) = AK\sqrt{1 + 8\left(\frac{t-t_0}{T}\right)^2 - 4\left(\frac{t-t_0}{T}\right)} \cos\left[W_1 t - \tan^{-1}\left(\frac{2(t-t_0)}{T-2(t-t_0)}\right)\right] \quad \begin{aligned} t_0 &\leq t < t_0 + \frac{T}{2} \end{aligned}$ (3c) $\begin{aligned} f_1(t) &= K - \frac{2K}{T}(t-t_0) \\ f_2(t) &= K - \frac{2K}{T}(t-t_0-\frac{T}{2}) \end{aligned}$  $g(t) = AK\sqrt{5 + 8\left(\frac{t-t_0}{T}\right)^2 - 12\left(\frac{t-t_0}{T}\right)} \cos\left\{W_1 t - \tan^{-1}\left[\frac{2T-2(t-t_0)}{T-2(t-t_0)}\right]\right\} \quad t_0 + \frac{T}{2} \leq t < t_0 + T$ (3d) $\begin{aligned} f_1(t) &= -K \\ f(t) &= 0 \end{aligned}$  $g(t) = -AK \cos W_1 t \quad t_0 + T \leq t$

FIG. 7b.

(4a) $\quad f_1(t) = K$
$\quad f_2(t) = K \quad g(t) = \sqrt{2}\, AK \cos(Wt - \frac{\pi}{4}) \quad t_0 > t$ (4b) $\quad f_1(t) = K(1 - 4\frac{t-t_0}{T})$
$\quad f_2(t) = K \quad t_0 \leq t < t_0 + \frac{T}{2}$ $g(t) = \sqrt{2}\, AK \sqrt{1 + 8(\frac{t-t_0}{T})^2 - 4(\frac{t-t_0}{T})} \cos\left[W_1 t - \tan^{-1}(\frac{1}{1-4(\frac{t-t_0}{T})})\right]$ (4c) $\quad f_1(t) = -K$
$\quad f_2(t) = K\left[3 - \frac{4(t-t_0)}{T}\right] \quad t + \frac{T}{2} \leq t < t_0 + T$ $g(t) = \sqrt{2}\, AK \sqrt{8(\frac{t-t_0}{T})^2 - 12(\frac{t-t_0}{T}) + 5} \cos\left[W_1 t - \tan^{-1}\left\{4(\frac{t-t_0}{T}) - 3\right\}\right]$ (4d) $\quad f_1(t) = -K$
$\quad f_2(t) = -K \quad g(t) = -\sqrt{2}\, AK \cos\left[W_1 t - \pi/4\right] \quad t_0 + T \leq t$

FIG.8d.

CONSTANT AMPLITUDE PSK MODULATOR

BACKGROUND OF THE INVENTION

1. Field of the Invention

The invention pertains to a field of signal modulation and more particularly to Phase Shift Keying modulation wherein the carrier signal amplitude remains constant during the phase transitions.

2. Description of the Prior Art

Phase Shift Keying (PSK) modulation of a carrier signal as performed in the prior art causes the carrier amplitude to vary during the phase transition stages, thus generating additional frequencies about the carrier over a bandwidth that is a function of the phase transition time.

In general, a PSK signal may be represented by $$S(t) = A \sin [W_1 t + 0d(t)]$$

where:
 A is the peak voltage of the transmitted system,
 0 is a phase angle that is made to lead or lag by the data d(t)
which takes on the values ±1.

In a suppressed carrier, PSK system, 0 is equal to $\pi/2$, so that S(t) may be represented as:

$$S(t) = Ad(t) \cos W_1 t$$

Since d(t) = ±1, it is apparent that the transmitted signals in a suppressed carrier PSK system undergo a 180 degree phase shift with each data transition. These transitions establish a data modulating signal comprising a series of pulses having width equal to the number of data intervals between the phase transitions, as shown in FIG. 1a. Each pulse causes the transmitted signal to exhibit a sin x/x Fourier transform, centered at $W_1$, which has a spectral width that is a function of the pulse width and weighted by a phase shift term that is dependent upon the pulse position. The formation of these weighted sin x/x distributions is the spectral representation of the transmitted signal.

In the prior art, a signal for transmission as a suppressed carrier PSK modulated signal is generated by coupling the signal to be modulated and the modulating data to a double balanced mixer 11 as shown in FIG. 1b. In some applications, the signal output from the double balanced mixer 11 is coupled to a bandpass filter 12 for the surpression of undesired frequency components, and therefrom to a hard limiting amplifier 13 to insure that a constant level signal is transmitted from the antenna 14. This hard limiting, however, regenerates a significant percentage of the signal frequency suppressed by the bandpass filter.

Though the phase changes are represented as instantaneous in FIG. 1a, in reality the transition is accomplished in a finite time. It is also accompanied by an amplitude variation of the carrier signal during the phase transition period as represented by the regions 15 in FIG. 2a. These rapid amplitude and phase variations generate a wide band of frequencies whch are undesired in terms of transition spectrum usage. It is desired that the modulated signal bandwidth be as narrow as possible to permit a narrow transmission bandwidth, thus providing maximum transmission efficiency. Filtering the data modulated signal in the bandpass filter 12 provides a signal at the input terminals of the amplifier 13 that exhibits a smooth amplitude transition over a longer transition period as represented by regions 16 in FIG. 2b. The amplitude reduction during the phase transition period reduces the signal energy during this period of rapid phase transition. Since most of the frequencies within the wide bandwidth are generated by the rapid phase transitions, reducing the signal energy during this period unless these undesired frequencies. Since it is desired to transmit a constant amplitude signal, the output signal of the bandpass filter 12 is hard limited in amplifier 13 to establish an amplitude envelope between levels 17a and 17b as shown in FIG. 2b. It should be apparent from FIG. 2b, that this hard limiting restores the signal energy dùring the period of rapid phase transition and, as a result, regenerates signals at the undesired frequencies. A solution to this problem may be realized by slowing down the rate of phase change and maintaining a constant signal amplitude during each phase transition period. A slow phase change rate reduces the generation of the undesired frequencies. With such phase transitions the hard limiter does not generate the undesired frequencies, because it does not alter the phase transition rate when the modulated signal is of a constant amplitude.

SUMMARY OF THE INVENTION

In constant amplitude PSK modulator embodying the principles of the present invention, a signal divider receives a signal for PSK modulation and provides two signals at the carrier frequency that are of equal phase amplitude. One signal is coupled directly to a multiplier wherein multiplication of the signal by a first modulating signal, derived from the modulating data, is performed. The second signal is phase shifted by 90 degrees prior to coupling to a second multiplier wherein multiplication by a second modulating signal, derived from the modulating data, is performed. The two products at the output terminals of the multipliers are coupled to a summation network to provide a sum signal which maintains a near constant amplitude during carrier signal phase transitions caused by data changes.

In one embodiment of the invention, a cosine function of time, having a period that is twice the data transition interval, is provided by the modulating signal generator during the phase transition period to multiply that portion of the carrier signal that has not been phase shifted, while a sine function of time, with a period which is equal to that of the cosine function, is provided by the modulating signal generator during the phase transition interval to multiply that portion of the carrier that has undergone a 90 degree phase shift. The summation of these two signals establishes a signal at the carrier frequency that maintains a constant amplitude during the phase transition.

In a second embodiment of the invention, the modulating signal generator provides a linearly decreasing voltage during the phase transition interval to multiply that portion of the carrier that has not been phase shifted, while providing an initially increasing triangular voltage function to multiply that portion of the carrier signal that has been phase shifted by 90 degrees. The summation of the two products in this embodiment establishes a signal that exhibits a small variation in amplitude over the phase transition interval. Though the amplitude of the signal during the phase transition interval is not constant in this embodiment, the variation from a constant amplitude is sufficiently small so that amplification by a hard limter does not significantly regenerate the undesired frequencies.

In a third embodiment of the invention, the modulating signal generator provides two voltages that vary linearly with time. The first of these voltages is established during the first half of the phase transition interval, commencing at the initialization of the phase transition. This first voltage multiplies that portion of the carrier that has not been phase shifted, while the phase shifted portion of the carrier signal is maintained at a constant level. The second linearly varying voltage is established during the second half of the phase transition interval, commencing after a time delay of one-half the phase transition interval. This second voltage multiplies that portion of the carrier signal that has been phase shifted by 90 degrees until the phase transition interval is terminated, while the unphase shifted portion of the carrier is maintained at its mid-phase transition interval level. The summation of the two products provides a signal that exhibits an amplitude variation during the phase transition interval equal to that provided by the second embodiment of the invention. This third embodiment imparts an additional phase shift of 45 degrees to the transmitted signal, which is inconsequential to the detection of the data at the receiver.

The purpose of these preferred embodiments is to slow down the rate of phase transitions during the phase transition period, thereby preventing the generation of undesired frequencies.

BRIEF DESCRIPTION OF THE DRAWINGS

FIG. 1a is a representation of data used for phase modulating a carrier signal. Phase reversals of the carrier taking place during the indicated level transitions.

FIG. 1b is a block diagram of a double balance mixer used in the prior art for phase modulating a carrier signal.

FIG. 2a is a representation of a carrier envelope formed by prior art modulation with the amplitude variations generated during the phase transition intervals indicated thereon.

FIG. 2b is a representation of the carrier envelope resulting at the filtering of the prior art modulated carrier signal and the resulting envelope after hard limiting the filtered modulated carrier signal.

FIG. 4c is a waveform of a modulating signal utilized to phase reverse the carrier signal of FIG. 4a.

FIG. 6a is a block diagram of a constant amplitude phase modulator.

FIG. 6b show equations useful in explaining the operation of FIG. 6a.

FIG. 6c is a block diagram of a modulating generator for providing sine and cosine functions during a transition interval.

FIG. 6d is a block diagram of an apparatus that may be utilized as the oscillator for FIG. 6C.

FIG. 6e shows a truthtable of a terminal output.

FIG. 7b shows equations useful in explaining the operation of FIG. 7a.

FIG. 8b shows linearly varying signals that may be utilzied to provide the phase and amplitude variations shown in FIG. 8a.

FIG. 8c is a schematic diagram of a modulating signal generator for providing the linearly varying voltages of FIG. 8a.

FIG. 8d show equations useful in explaining the operation of FIG. 8c.

DESCRIPTION OF THE PREFERRED EMBODIMENT

Figure 3:
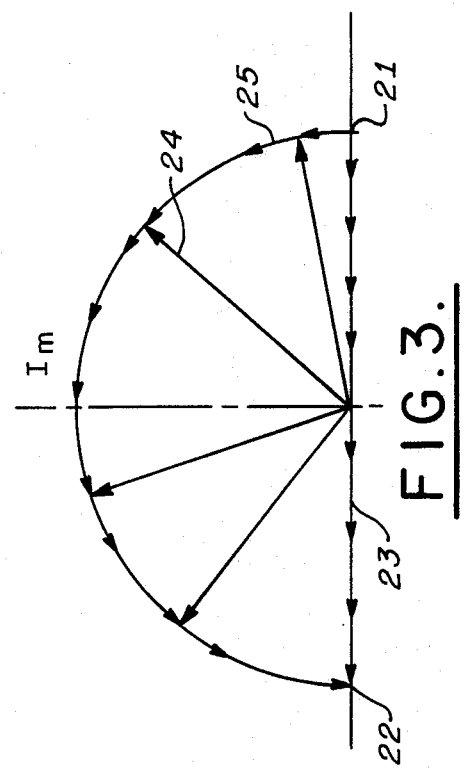
FIG. 3 is a phasor diagram indicating phase variation during a phase transition interval for non-constant and constant amplitude phase modulation.
Figure 4A:
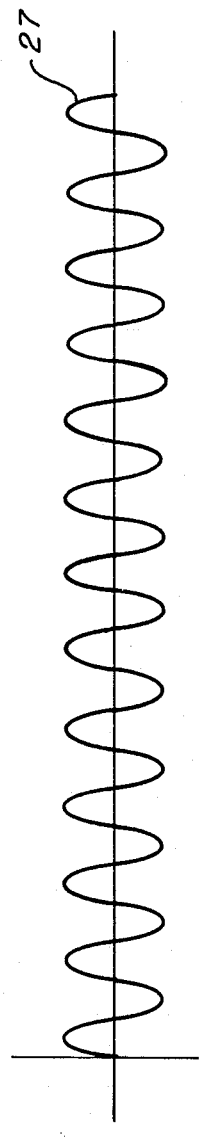
FIG. 4a is a waveform of an unmodulated carrier.
Figure 4B:
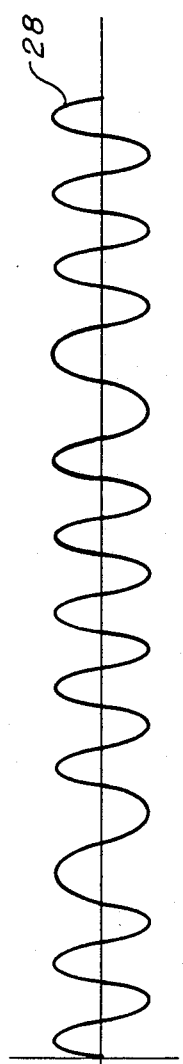
FIG. 4b is a waveform of a carrier phase modulated in accordance with the present invention.
Figure 4C:
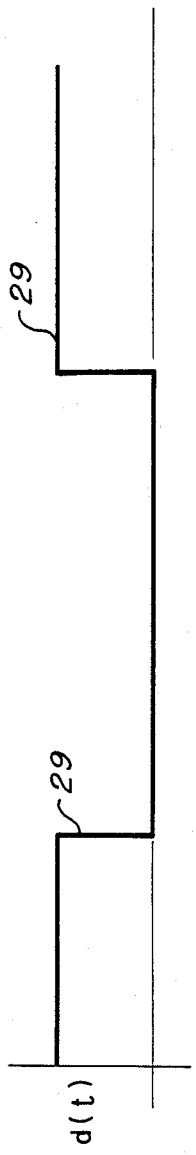

The prior art double balance mixer of FIG. 1b provides phase reversals during the phase transition interval by providing a rapid amplitude variation, as for example, from a positive value to a negative value. This amplitude variation may be represented as a series of vectors along the real axis, as for example, from the point 21 to the point 22 along the line 23 in FIG. 3. Thus, during the phase transition interval, the amplitude of the envelope varies as shown in the region 15 of FIG. 2a. As the signal amplitude passes through zero volts, the phase instantly changes by 180 degrees. Those skilled in the art will recognize that this rapid amplitude variation and instantaneous phase reversal generates undesired frequency components. As previously discussed, filtering the resulting modulated carrier signal to eliminate the undesired frequency components further distorts the carrier signal envelope and hard limiting the filtered signal to re-establish a constant amplitude for the modulated carrier regenerates the undesired frequency signal components. If the phase transition is slowed and accomplished without an amplitude variation, the undesired signal frequency components are not generated. This may be realized by providing a phase transition wherein the phasors 24 of the carrier signal during the phase transition interval have end points along the circle 25 about the origin as the phase changes, as for example, from 0 to 180 degrees, as shown in FIG. 3. A carrier 27 that is to be constant amplitude phase modulated is shown in FIG. 4a, while the resulting modulated carrier 28 is shown in FIG. 4b. A modulating data signal for this phase transition may be the waveform 29 shown in FIG. 4c.

Figure 5A:
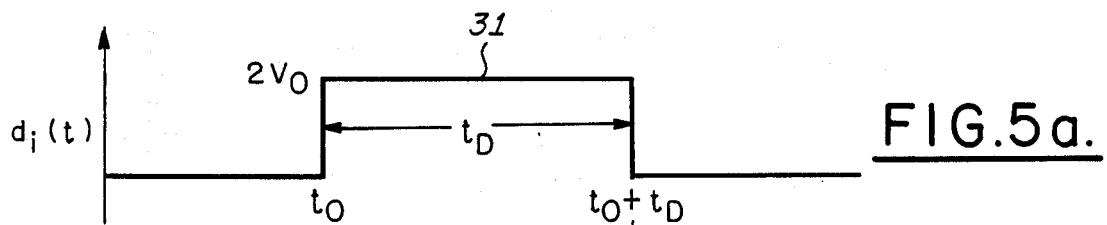
FIG. 5a shows a pulse representative of a constant phase carrier signal interval.
Figure 5B:
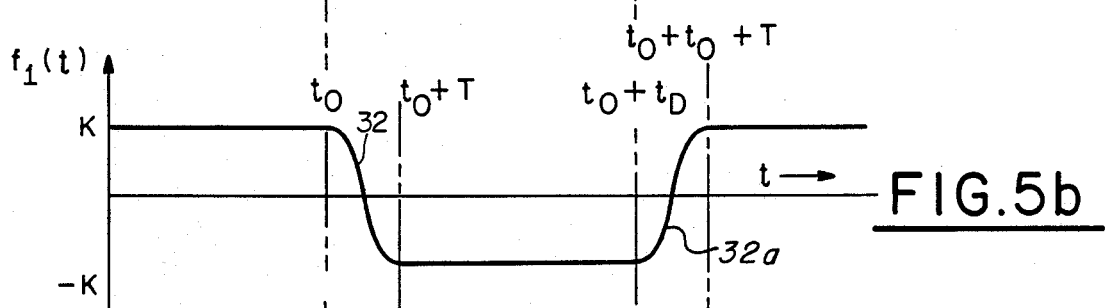
FIGS. 5b and 5c show signals that may be utilized during phase transition intervals for a constant amplitude phase transition.
Figure 5C:
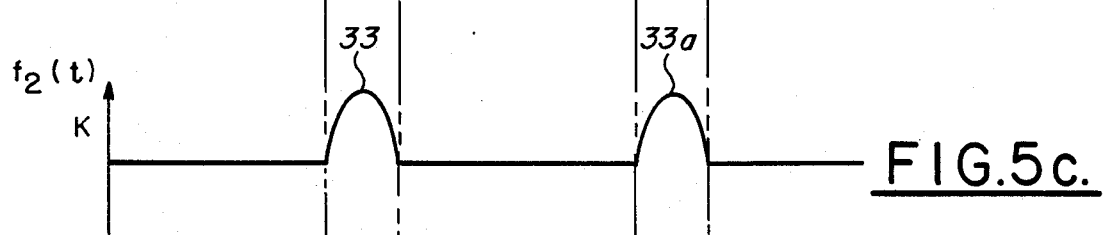

Refer now to FIGS. 5a–5c. A data pulse 31 of width $t_D$ initiates a phase transition at a time $t_O$. This transition is accomplished over the interval T and the carrier phase remains in the transition state until a time $t_O + t_D$, whereafter a transition, during the transition interval T, occurs to return the carrier to the initial phase. Consider a function $f_1(t)$, in FIG. 5b, having a cosinusoidal variation with time during the transition interval between levels equal to a $\pm K$ and a function $f_2(t)$, in FIG. 5c, having a sinusoidal variation with time and a peak level K during the transition interval and is of a zero level otherwise. If these functions respectively multiply two sinusoidal signals in phase quadrature and the resulting products summed, a signal of constant amplitude is produced with a phase angle that is equal to the arc tangent of the ratio of $f_2(t)/f_1(t)$.

Refer now to FIG. 6a. A carrier signal generator 35 is coupled to a signal divider 37 which provides two signals of equal amplitude and phase. The first signal, which may be represented as A cos $w_1 t$ is directly coupled to a multiplier 39, while the second is coupled through a $\pi/2$ phase shifter 41 to provide a signal which may be represented as A sin $w_1 t$ to a second multiplier 43. A modulating signal generator 45 couples the signal $f_1(t)$ to multiplier 39 wherefrom the product signal A $f_1(t)$ cos $w_1 t$ is coupled to summation network 47. Modulating signal generator 45 also couples the function $f_2(t)$ to multiplier 43 wherefrom the product signal A $F_2(t)$sin $w_1 t$ is coupled to summation network 47. It should be remembered that the modulating signal generator provides the functions $f_1(t)$ and $f_2(t)$ in response to the modulation data.

The output signal from the summation network 47 g(t), as a function of $f_1(t)$ and $f_2(t)$, is given in equation 2 of FIG. 6b. Consider the interval wherein t is less than $t_o$ in FIGS. 5a through 5c. In this interval, $f_1(t)$ is equal to K while $f_2(t)$ is equal to 0. Utilizing these values in equation 2, provides $g_A(t)$=AK cos $w_1 t$ as shown in equation 2a of FIG. 6b. In the transition interval, ($t_o < t \leq t_o + T$), $f_1(t)$ and $f_2(t)$ are sine and cosine functions as shown in equation 2b, which provide the output function $g_B(t)$ shown in equation 2b. The function $g_B(t)$ exhibits a phase that varies with time during the transition interval while maintaining a constant amplitude AK. At the time $t=t_o+T$, the phase transition is complete and $g_B(t)$ has undergone a 180 degrees phase shift. At this time, the functions $f_1(t)$ and $f_2(t)$ are equal to $-K$ and 0 respectively as shown by equation 2c in FIG. 6b.

When the subsequent data transition interval commences at the time $t_o+t_D$, the modulating signal generator 45 respectively couples the cosine function 32a, having a phase shift of 180° from the cosine function 32, and the sine function 33a, which may have a phase shift of 0° or 180° relative to the sine function 33, to multipliers 39 an 43. The summation of the products of multipliers 39, 43 provides a $g_D(t)$, shown in equation 2d, that possesses a constant amplitude while undergoing a phase change from 180° to 0°. When this transition is complete $f_1(t)=K$ and $f_2(t)=0$ providing a $g_E(t)=AK$ cos $w_1 t$, as shown in equation 2e.

A block diagram of a circuit that may be utilized in the modulating signal generator 45 to provide the transitional sine and cosine functions is shown in FIG. 6c, while the output waveforms of the elements in this circuit are shown in FIG. 6d. Referring to FIGS. 6c and 6d, a clock 51 couples a train of pulses 53 to a timing generator 55, wherefrom a square wave 57, at a repetition rate equal to one half the repetition rate of the clock pulses, is coupled to a low pass filter 59 and a data generator 61. The timing generator 55 also multiplies the clock period by an odd multiple to establish a data period, a data period may be selected, as represented in the clocked data signal 63, to extend over nine (9) clock periods. The data period clock pulses and the data for transmission are coupled to the data generator 61. A signal 65 which is a cosinusoidal function of time having a frequency equal to one half the clock repetition rate, is coupled from the output terminal of the low pass filter 59 to input terminals 2 and 3 of an analog 4 to 1 multiplexer 67. Input terminals 0 and 1 of multiplexer 67 are coupled to constant voltages K and $-K$, respectively. The output terminal of low pass filter 59 is also coupled to a 90° phase shifter 70 wherefrom a signal 71 which is a sinusoidal function of time having a frequency equal to that of the cosine signal 65 is coupled to terminals 2 and 3 of a second 4 to 1 multiplexer 69, the 0 and 1 terminals of which are coupled to ground.

The data generator 61 couples a gating signal 73, via line 74, to select terminals $S_0$ and couples the clocked data signal 63, via line 76, to select terminals $S_1$ of multiplexers 67, 69. Multiplexers 67, 69 couple the input terminals 0 through 3 to the output terminal in accordance with the truthtable shown in FIG. 6e. The gating signal 73 provides a high level signal 75 for the duration of a data transition interval and a low level signal at all other times.

From FIGS. 6c and 6e it is readily seen that $f_1(t)$, the signal at the output terminal of multiplexer 67, is equal to K when the clocked data signal 63 is low and is not in transition, is equal to $-K$ when the clocked data signal 63 is high and not in transition, is equal to one half a period of the cosine function 65 as shown by the function 77 in FIG. 6d when the clocked data transition is low to high, and is equal to one half a period of the cosine function 65, as shown by the function 79, when the clocked data transition is high to low. Similarly, $f_2(t)$, the signal at the output terminal of multiplexer 69, is equal to zero when the clocked data is not in transition, and is equal to one half a period of the sine function 71, shown by functions 81 and 83 in FIG. 6d, when the clocked data is in transition.

Figure 5D:
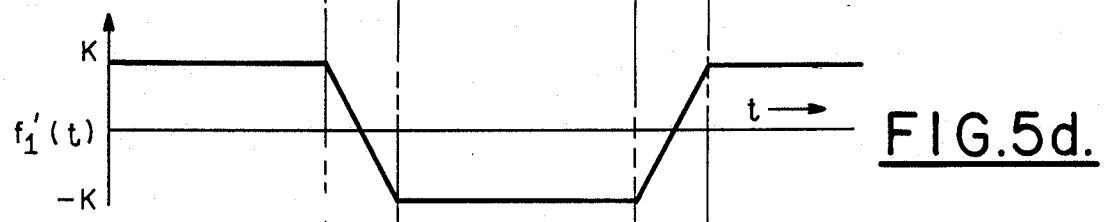
FIGS. 5d and 5e show signals that may be utilized to approximate the constant amplitude phase transition of FIG. 5b and 5c.
Figure 5E:
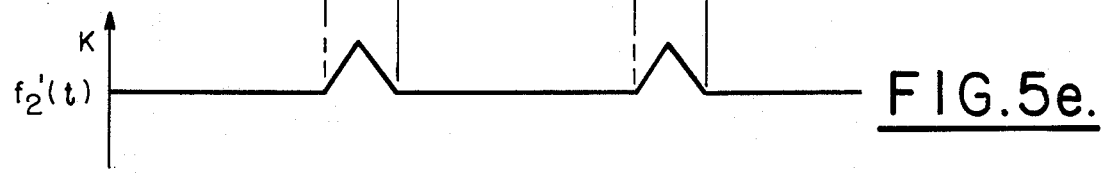

The complexities of the circuitry shown in FIGS. 6c and 6d may be appreciably reduced by approximating the cosine and sine transition functions with a straight line and triangular waveform respectively as shown in FIGS. 5d and 5e.

Figure 7A:
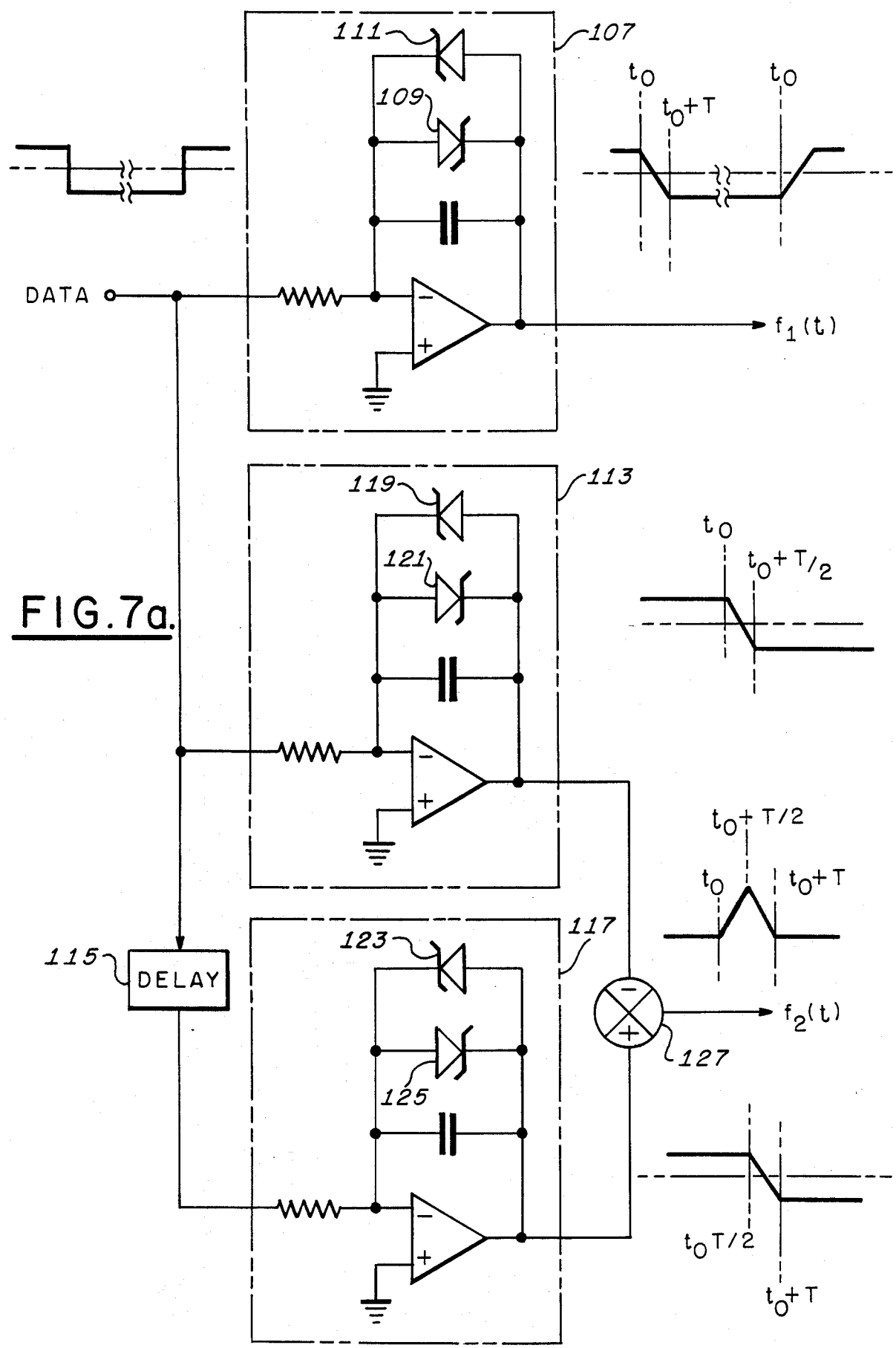
FIG. 7a is a schematic diagram, partially in block form, of a modulation signal generator that may be used to provide the modulating signals of FIGS. 5d and 5e.

Referring to FIG. 7a, a data signal is coupled to the input terminals of an integrating circuit 107 designed to saturate at a level corresponding to the data signal level after a time T, the transition interval, from the initiation $t_0$ of a data transition, thereby providing a ramp function in the time interval between $t_0$ and $t_0+T$ and a constant output at the saturation level for times subsequent to $t_0+T$. Integrator 107 maintains this constant value until the next data transition at time $t_0+t_D$, when a ramp is initiated, having an equal but negative slope to that of the first ramp, to saturate the integrator at a level that is the negative of the first saturation level. These saturation levels may be realized by clamping the output signal from integrator 107 between desired positive and negative modulation levels by Zener diodes 109 and 111. Signals at the output terminal of integrator 107 are coupled to multiplier 39 as the function $f_1(t)$. Values of $f_1(t)$ for various phases of the data signal are given in equaions 3a through 3d in FIG. 7b.

The data signals are also coupled to an integrator 113 and, via delay line 115, to integrator 117. These integrators are clamped between the desired positive and negative modulation levels by Zener diodes 119, 121 and 123, 125 respectively and achieve the transition from one modulation level to the other over a time T/2, one half the transition interval. Integrator 113 achieves the transition between $t_O$ and $t_O+T/2$, where $t_O$ is the initiation time of the transition interval and T its duration, while integrator 117, due to the delay caused by delay line 115, achieves the transition between $t_O+T/2$ and T. Signals at the output terminal of integrator 113 are coupled to an inverting terminal of summation network 127, while signals at the output terminal of integrator 117 are coupled to a noninverting terminal of the summation network 127. The output signals are combined in the summation network 127 to establish the triangular waveform 129. This triangular waveform comprises the function $f_2(t)$. The value of this function during the various phases of the data signal is given in equations 3a through 3d in FIG. 7b.

Figure 7C:
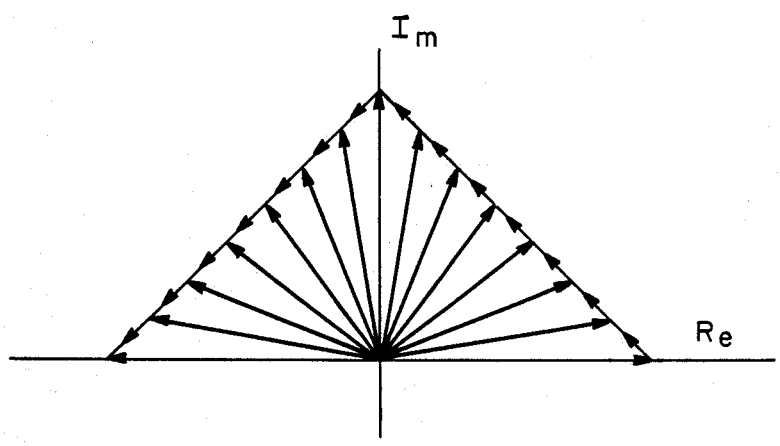
FIG. 7c is a phasor diagram indicating the phase and amplitude variations during the phase transition interval for the modulating signals of FIGS. 5d and 5e.

A diagram indicating the amplitude and phase of the function g(t) during the transition interval is shown in FIG. 7c. Though the amplitude of these vectors vary, the variation is only in the order of 3 dB and a significant improvement in slidelobe performance is realized over the modulation techniques of the prior art.

Figure 8A:
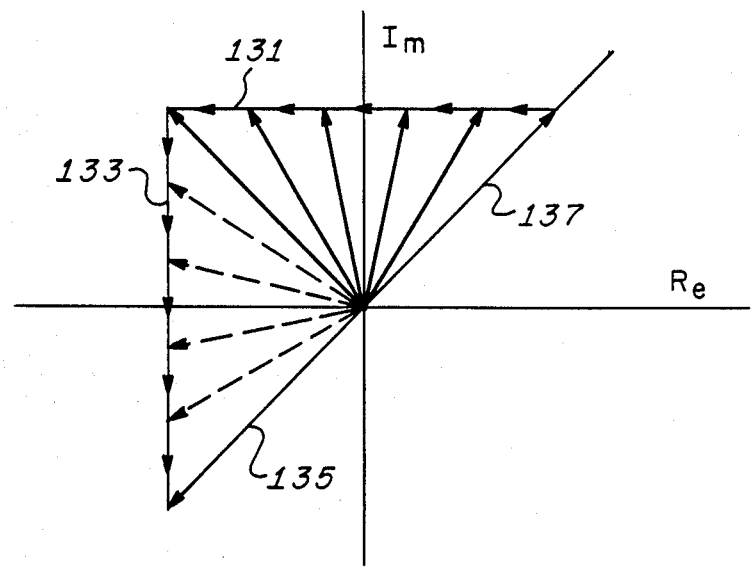
FIG. 8a is a phasor diagram indicating the phase and amplitude variations during the phase transition interval for linearly varying modulating signals.
Figure 8B:
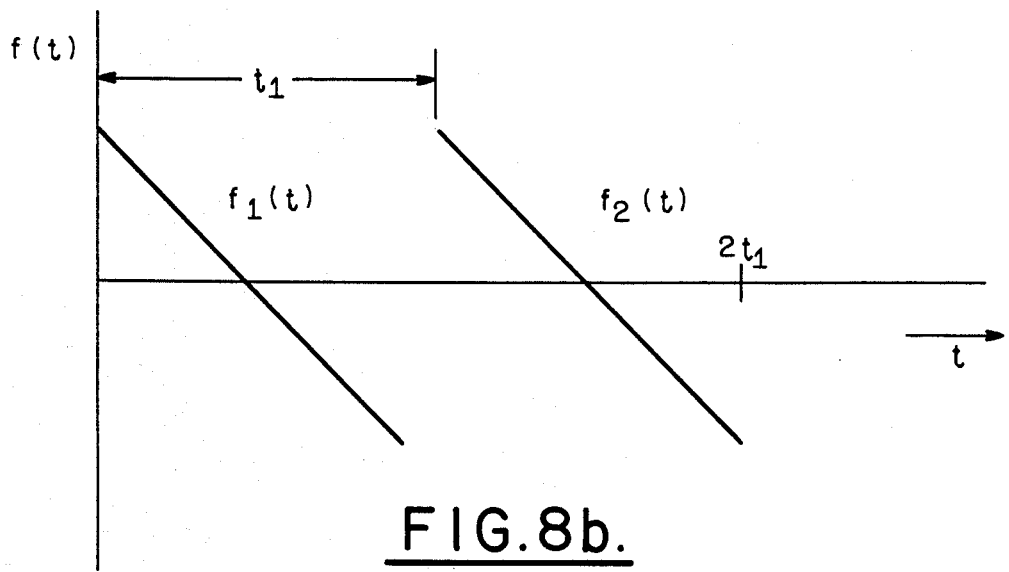

Refer now to FIG. 8a wherein the vector diagram of FIG. 7c is rotated through an angle of 45 degrees. This diagram represents a carrier phase transition that is accomplished by varying the real part of the modulating signal $f_1(t)$ between symmetrical limits while maintaining the imaginary part constant for one-half the transition interval, as for example, varying $f_1(t)$ along the line 131. At the conclusion of this half interval, $f_1(t)$ is held constant while the imaginary part of the modulating signal $f_2(t)$ is varied between symmetrical limits, as for example along the line 133. It is apparent from the diagram that the final vector 135 has undergone a 180 degree phase shift relative to the initial vector 137. Though phase rotation of 45 degrees from the real axis is realized with this procedure, this is but an initial phase condition that does not affect the relationship between the carrier signal before and after the transition interval. The phase transitions indicated in FIG. 8a may be implemented by establishing $f_1(t)$ as a linear function of negative slope for a duration $t_1$ and establishing $f_2(t)$, parallel to $f_1(t)$ commencing at $t_1$ and extending over an equal interval, as shown in FIG. 8b.

Figure 8C:
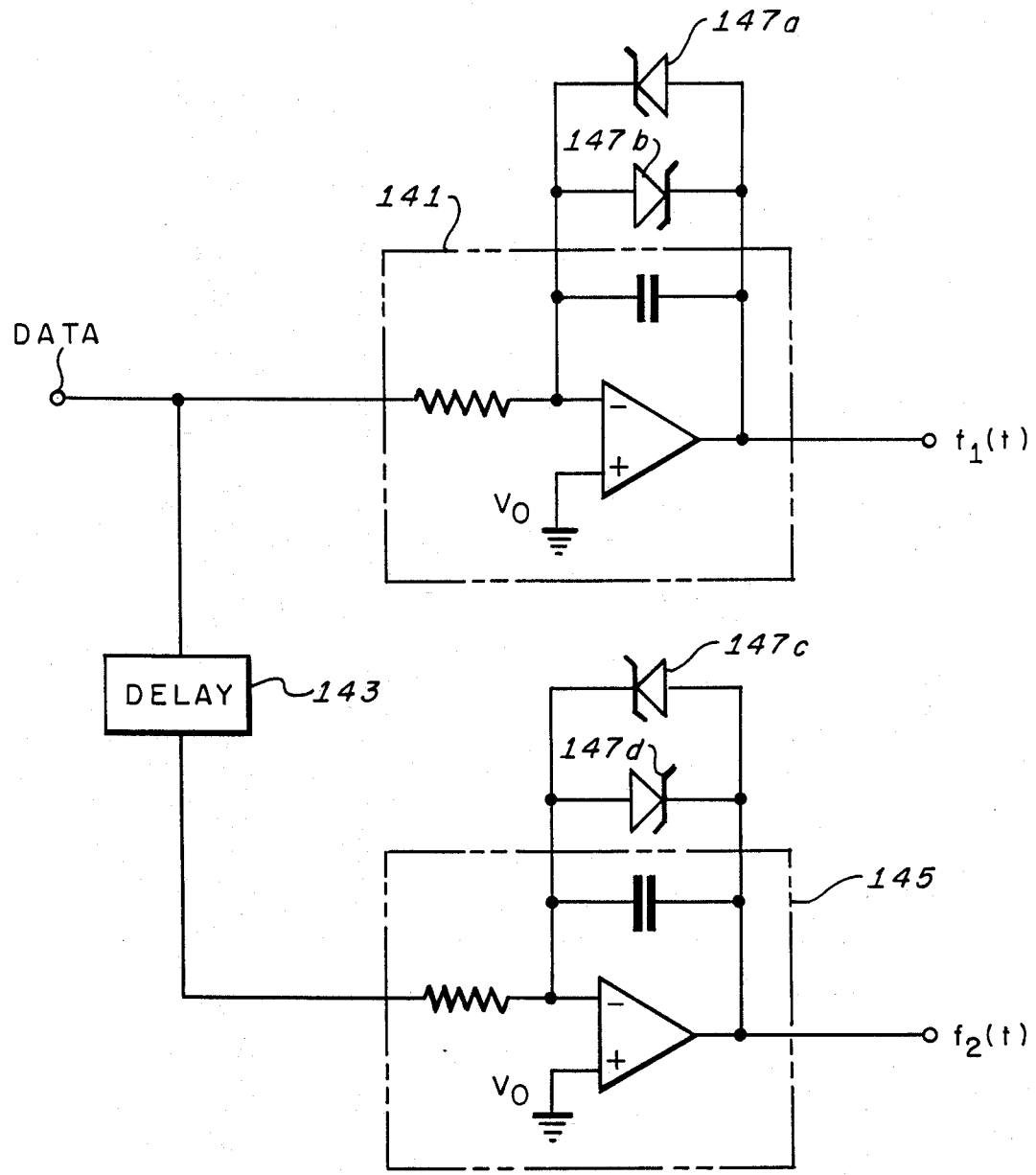

The transition of FIG. 8a may be realized with the circuit shown in to FIG. 8c. A data signal is coupled to integrator 141 and, via delay line 143, to an identical integrator 145. These integrators are clamped between the desired positive and negative modulation levels by the Zener diodes 147a-147d. The functions $f_1(t)$, $f_2(t)$, and the resulting g(t) provided by the circuit of FIG. 8c are shown in equations 4a-4d of FIG. 8d.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. An apparatus for phase modulating a carrier signal in accordance with a received data signal having two signal levels changeable from a first signal level to a second signal level over a transition interval by shifting the carrier signal phase from one predetermined phase value to a second predetermined phase value during the level transition interval comprising:
   means coupled to receive said carrier signal for providing first and second quadrature related signals having equal amplitudes;
   modulating signal means coupled to receive said data signal for providing first and second modulating data signals said first modulating data signal having an amplitude variation over a data transition interval that is a cosine function of time and said second modulating data signal having an amplitude variation over a data transition interval that is a sine function of time, said cosine function of said sine function having a period equal to twice said transition interval;
   first multiplying means coupled to receive said first signal and said first modulating data signal for providing a first product signal representative of said first signal multiplied by said first modulating data signal;
   second multiplying means coupled to receive said second signal and said second modulating data signal for providing a second product signal representative to said second signal multiplexed by said second modulating data signal;
   said first and second product signals having a predetermined functional relationship in said transition interval to provide a constant amplitude signal during a phase transition from said one phase value to said other phase value when said first and second product signals are combined; and
   summing means coupled to said first and second multiplying means for summing said first and second product signals to provide a signal representative of said carrier signal phase modulated in accordance with said data signal.

2. The phase modulating apparatus in accordance with claim 1 wherein said phase shift means is constructed and arranged such that said preselected phase angle is 90°.

3. A phase modulating apparatus in accordance with claim 1 wherein said modulating signal means includes:
   first integrator means coupled to receive said data signal for integrating said data signal from a first saturation level to a second saturation level over a first time period equal to one-half said level transition interval;
   delay means coupled to receive said data signal for delaying said data signal for a time period equal to one-half said level transition interval; and
   second integrator means coupled to receive said delayed data signal for integrating said delayed data signal from said first saturation level to said second saturation level over a second time period equal to one-half said level transition interval to provide said second modulating signal, said second time period commencing when said first time period is concluded.

4. A phase modulation apparatus in accordance with claim 2 wherein said modulating signal means is constructed and arranged such that said first modulating signal has an amplitude variation over a data transition interval that is a cosine function of time with a period equal to twice said transition interval and said second modulating signal has an amplitude variation over a data transition interval that is a sine function of time with a period equal to twice said transition interval.

5. A phase modulating apparatus in accordance with claim 1 wherein said modulating signal means includes:
   clock means for providing clock pulses at a predetermined frequency;
   timing generator means coupled to receive said clock pulses for providing pulses at a first frequency having a first selected relationship to said predetermined frequency and for providing data clock pulses at a second frequency having a second selected relationship to said predetermined frequency;

means coupled to receive said pulses at said first frequency for providing a first signal having an amplitude variation with time that is a cosine function with a frequency equal to said first frequency and a second signal having an amplitude variation with time that is a sine function with a frequency equal to said first frequency;

data generator means coupled to receive said data signal, said data clock pulses, and said pulses at said first frequency for providing gating pulses and clocked data signals such that said clocked data signals have data transitions occurring with said gating pulses;

first multiplexer means having output means coupled to said first multiplying means and having first input means for receiving a first constant signal having a predetermined polarity, second input means for receiving a second constant signal having a polarity opposite said predetermined polarity, third input means coupled to receive said first signal, first select means couled to receive said clocked data signals, said first multiplexer means for selectively coupling said first, second, and third input means thereof to said output means thereof in accordance with signal levels at said first and second select means thereof thereby providing said first modulating signal to said first multiplying means;

second multiplexer means having output means coupled to said second multiplying means and having first input means coupled to ground, second input means coupled to receive said second signal, first select means coupled to receive said gating signals, and second select means coupled to receive said clocked data signals, said second multiplexer means for selectively coupling said first and second input means thereof to output means thereof in accordance with signal levels at said first and second select means thereof, thereby providing said second modulating signal to said second multiplying means.

6. A phase modulating apparatus in accordance with claim 5 wherein said first frequency is one half said predetermined frequency and said second frequency is one-ninth said predetermined frequency.

7. A phase modulating apparatus in accordance with claim 1 wherein said modulating means includes:
a first integrator coupled to receive said data signal constructed and arranged to integrate from a first saturation level to a second saturation level over a time period equal to said level transition interval, thereby providing said first modulating function;
second and third integrators constructed and arranged to integrate from said first saturation level to said second saturation level over a time period equal to one-half said level transition interval, said second integrator means coupled to receive said data signal;
a delay circuit having an input terminal coupled to receive said data signal and an output terminal coupled to an input terminal of said third integrator, constructed and arranged to delay said data signal by a time period equal to one-half said level transition interval; and
a difference network having a first input coupled to receive integrated signals from said second integrator and a second input coupled to receive integrated signals from said third integrator, thereby providing a triangular pulse initiated at a commencement of a level transition interval, reaching a peak at an elapsed time equal to one-half said level transition interval, and terminating at a conclusion of said transition interval.

8. An apparatus for phase modulating a carrier signal by shifting the carrier signal phase from a first predetermined value to a second predetermined value over a transition interval of a received data signal having two signal levels changeable from one signal level to the other over the transition interval comprising:
means coupled to receive said carrier signal for providing first and second quadrature related signals having equal amplitudes;
modulating signal means coupled to receive said data signal for providing first and second modulating data signals, said first modulating data signal having a linear varying amplitude function over a data transition interval and said second modulating data signal having a triangularly varying amplitude over a data transition interval;
multiplying means coupled to receive said first and second quadrature related signals and said first and second modulating data signals for providing a first product signal representative of said first signal multiplied by said first modulating data signal and a second product signal representative of said second signal multiplied by said second modulating data signal; and
summing means coupled to receive said first and second product signals to provide a signal representative of said carrier signal phase modulated in accordance with said first and second modulating signals, phase modulation of said carrier signal performed in a manner that maintains a near constant signal amplitude during transition intervals.

9. A phase modulating apparatus in accordance with claim 8 wherein said modulating signal means comprises:
first integrating means for integrating said data signal to provide said first modulating data signal having a first linear predetermined function of predetermined slope, a constant value region commencing at a time at which said first linear function terminates and concluding when a next following level transition commences, and a second predetermined linear function commencing at said conclusion of said constant value region and having a predetermined slope equal and negative to said predetermined slope of said first linear function;
second integrating means responsive to said data signal for providing a first preselected linear function having a first preselected slope;
delay means coupled to receive said data signal for delaying said data signal for a time corresponding to one-half of a transition interval to provide a delayed data signal,
third integrating means responsive to said delayed data signal for providing a second preselected linear function having a second preselected slope that is equal and opposite to said first preselected slope; and
summation means coupled to receive said first and second preselected linear functions for combining said first and second linear functions to provide a triangular pulse of duration corresponding to a data transition interval, said triangular pulse comprising said second modulating data signal.

* * * * *